(12) United States Patent
Dapkus et al.

(10) Patent No.: US 7,788,716 B2
(45) Date of Patent: Aug. 31, 2010

(54) TOKEN HANDLER API

(75) Inventors: Peter Dapkus, Oakland, CA (US); Corinna Witt, San Francisco, CA (US)

(73) Assignee: Bea Systems, Inc., Redwood Shores, CA (US)

( * ) Notice: Subject to any disclaimer, the term of this patent is extended or adjusted under 35 U.S.C. 154(b) by 938 days.

(21) Appl. No.: 11/131,554

(22) Filed: May 18, 2005

(65) Prior Publication Data
US 2005/0273844 A1 Dec. 8, 2005

Related U.S. Application Data

(60) Provisional application No. 60/573,268, filed on May 21, 2004.

(51) Int. Cl.
*H04L 9/00* (2006.01)
(52) U.S. Cl. ............... 726/18; 726/5; 726/19; 726/20; 726/9; 713/159; 713/164
(58) Field of Classification Search ........... 709/206, 709/224, 225, 226; 707/10; 726/8, 9, 10, 726/14, 20, 18; 370/401; 713/159, 172, 713/185, 170
See application file for complete search history.

(56) References Cited

U.S. PATENT DOCUMENTS

| 7,249,373 | B2 * | 7/2007 | Shewchuk et al. | 726/5 |
| 7,533,264 | B2 * | 5/2009 | Ballinger et al. | 713/172 |
| 7,548,620 | B2 * | 6/2009 | Popp | 380/273 |
| 2003/0061404 | A1 * | 3/2003 | Atwal et al. | 709/328 |
| 2004/0015578 | A1 * | 1/2004 | Karakashian et al. | 709/223 |
| 2004/0064503 | A1 * | 4/2004 | Karakashian et al. | 709/203 |
| 2005/0114701 | A1 * | 5/2005 | Atkins et al. | 713/201 |

* cited by examiner

*Primary Examiner*—Taghi T Arani
*Assistant Examiner*—Mohammad L Rahman
(74) *Attorney, Agent, or Firm*—Fliesler Meyer LLP

(57) ABSTRACT

A token handler API which can be instantiated to allow for custom token types. The token handler API can interact with a web service security handler and security service provider interfaces of security framework in order to do a number of security functions such as authentication, digital signatures and encryption for SOAP messages in a Web Service security system.

17 Claims, 4 Drawing Sheets

TOKEN HANDLER API

CLAIM OF PRIORITY

This application claims priority to U.S. Provisional Application No. 60/573,268 entitled "Token Handler API" filed May 21, 2004.

FIELD OF INVENTION

The present invention relates to web service security systems.

BACKGROUND OF INVENTION

Web Services (WS) allow applications to share data, and to invoke capabilities from other applications without regard to how those applications were built, what operating system or platform they run on, and what devices are used to access them. Web Services are invoked over the Internet by means of industry-standard protocols including the Simple Object Access Protocol (SOAP); the eXtensible Markup Language (XML); and Universal Description, Discovery, and Integration (UDDI).

SOAP is an XML-based messaging technology standardized by the World Wide Web Consortium (W3C), which specifies the rules for locating Web services, integrating them into applications, and communicating between them. UDDI is a public registry where one can publish and inquire about Web services.

Web services security is also defined by standards. The Organization for the Advancement of Structured Information Standards (OASIS) has produced the SOAP message security standard. Part of the standard is the use of security tokens. These tokens are typically defined or referenced in the header of the SOAP message. The security tokens can be used for message authentication, digital signature and encryption/decryption. The specification defines a number of token types including User/Password pairs, X.509 certificates and Kerbos tickets.

DETAILED DESCRIPTION

Figure 1:
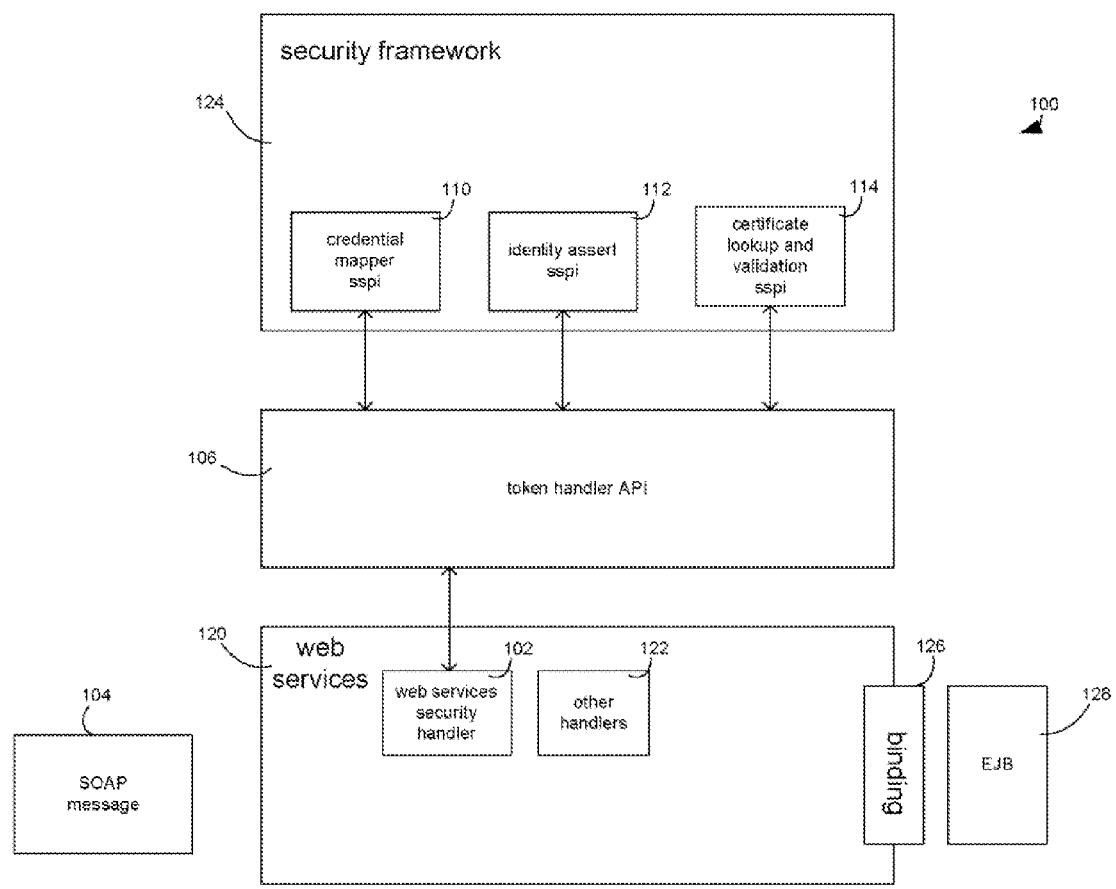
FIG. 1 is a diagram that illustrates one embodiment of a web services security system of the present invention.

FIG. 1 is a diagram that illustrates one embodiment of a web services security system 100 of one embodiment of the present invention. The web services security system 100 uses a security token to determine authorization for the use of a Web Service. The web services security system 100 can include a web services security handler 102. The web services security handler 102 can obtain tokens from the SOAP messages 104. A token handler Application Programming Interface (API) 106 can interact with the web services security handler 102.

The token handler API 106 can be instantiated to define custom security token types for Web Services. This allows newly developed token standards to be implemented without affecting the SSPI or web services security handler 102 or security service provider interface. The token handler API 106 allows designers to customize the token types used with the SOAP messages without recompiling the entire web services software. Updates for new token types can be added as new instances of the token handler API on a web page such as a developer web page. Different instances of the credential mapper SSPI 110 and/or identify assert SSPI 112 can be also created from the customer token type.

A security service provider interface (SSPI), such as the credential mapper SSPI 110, identity assert SSPI 112 or certificate lookup and validation SSPI 114, can interact with the token handler API. The token handler API 106 can use pre-written or customized SSPIs.

The SSPI can connect to or be part of a security framework such as the security framework in WebLogic Server™ or WebLogic Enterprise Security™ available from BEA Systems, Inc. of San Jose, Calif.

The token handler API 106 can include a number of sub-interfaces. The token handler API 106 can convert token XML into java object credentials for processing by the SSPI. The headers of the SOAP messages include tokens or references to tokens.

Looking at FIG. 1, a SOAP message 104 comes to the web service 120. In the Web Services logic 120 is a Web Service security handler 102. The Web Service Security Handler can provide tokens to the token handler API 106. Other handlers 122 for operating on incoming SOAP messages and constructing out going SOAP messages can also be used. The token handler API 106 and SSPI 110, 112 and 114 can be used for authorization, digital signatures and encryption. In one embodiment, the token handler API 106 and SSPIs and security framework 124 checks the authorization before the web service 120 provides a response to a user. The Web Service 120 can use the binding function 126 and Enterprise Java Beans (EJBs) 128.

Figure 2:
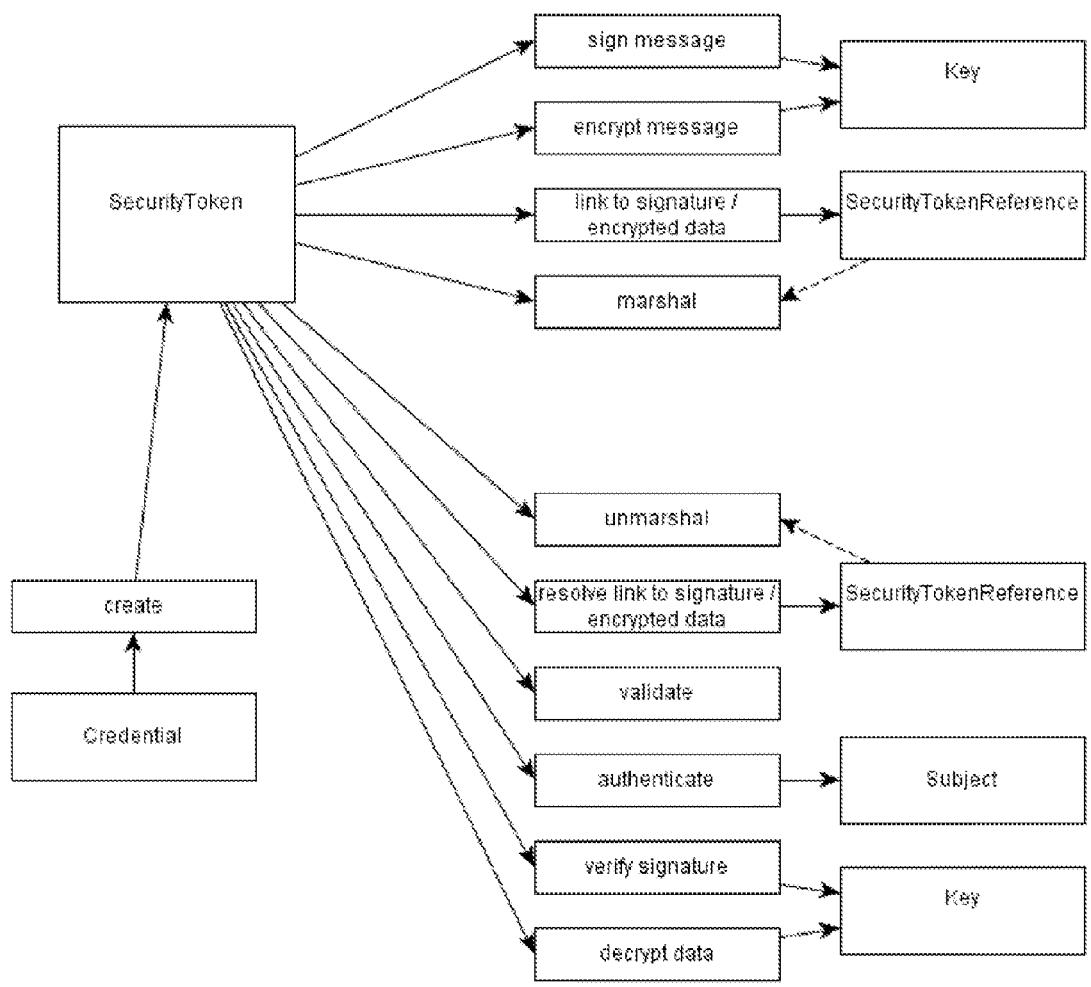
FIG. 2 is a diagram illustrating security token processing in one embodiment of the present invention.

FIG. 2 illustrates the use of security tokens in one embodiment of the present invention for web service security.

Figure 3:
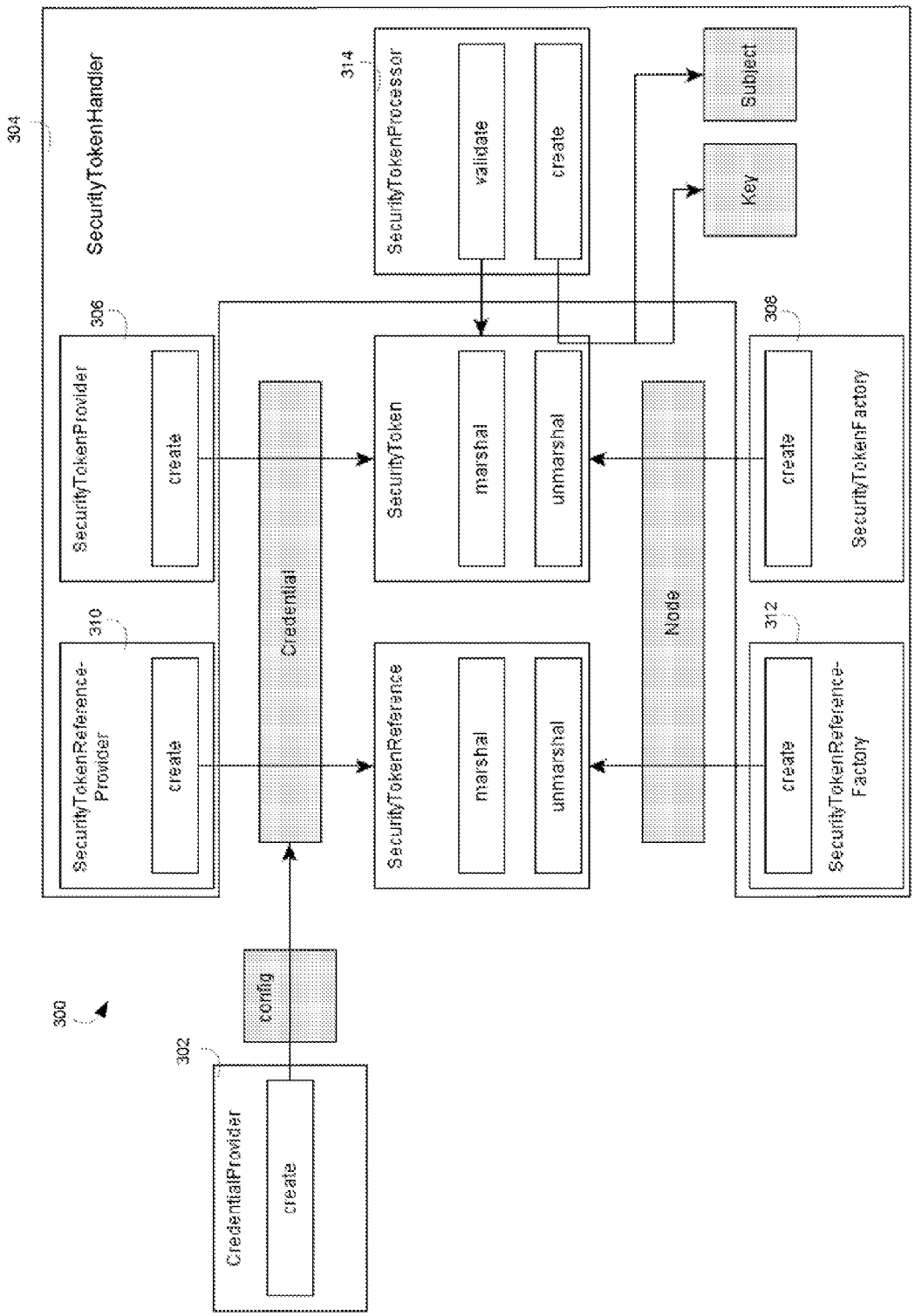
FIG. 3 is a diagram of a token handler API of one embodiment of the present invention.

FIG. 3 illustrates one example of a token handler API 300 of one embodiment of the present invention. In this example, a credential provider can use the credential mapper to get credentials based upon a token. The security token handler 304 can include a security token provider 306 and security token factory 308 creating security tokens; a Security Token Reference Provider 310 and Security Token Reference Factory 312 for creating a security token referencess (security token references can be obtained from the SOAP message header in some embodiments); and, a Security Token Processor 314 that can be used to validate security tokens and create keys and subjects from the security token. The keys and subjects can be used in digital signatures and encryption.

Figure 4:
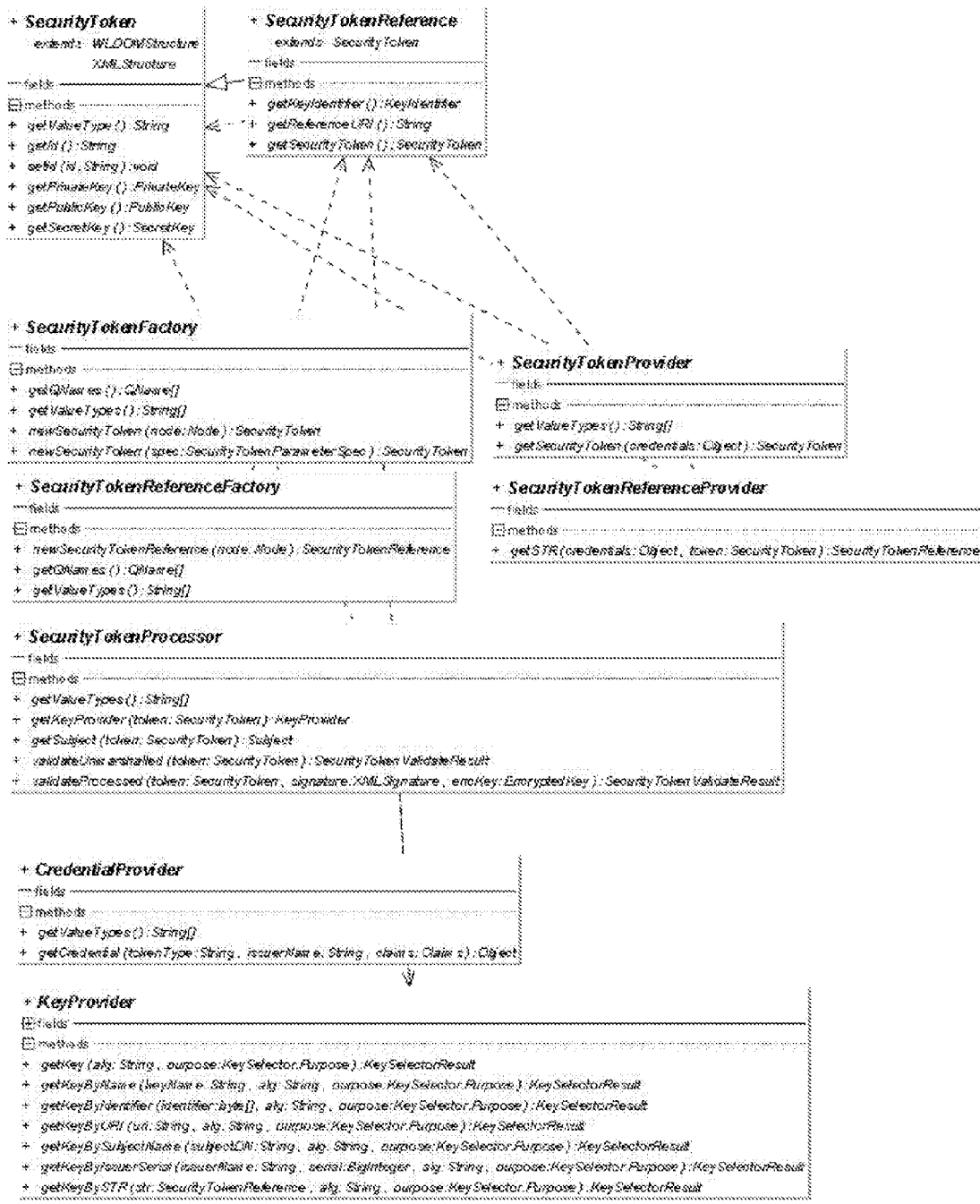
FIG. 4 is a UML document for the example of FIG. 3.

FIG. 4 is a diagram of a Unified Modeling Language (UML) representation of the token handle API of FIG. 3. The description is given as a non-limiting example in one embodiment.

Details of an Exemplary Embodiment

Message security can include integrity to ensure that the message or part of the message received has not been altered in transit. This can be implemented using digital signatures. Message security can include confidentiality to ensure that no one besides the sender and recipient can read the contents of the message or parts of the message. This can be implemented using encryption. Message security can include authentication to ensure that the person who claims to have sent/signed/encrypted the data is really the one who did send/sign/encrypt it. This can be implemented by the inclusion in the message of
1. security tokens which assert identity.
2. some kind of proof that the person whose identity is asserted is actually the author of the data (such as signing part of data along with a timestamp)

The concept of message-level authentication can apply to both the entire message and to specific parts of the message which may have been authenticated by a different person than the sender.

Digital Signatures (Dsig) and encryption can use security tokens that are included in the SOAP message. These security tokens can be of various types which are defined in auxiliary WS-Security "profiles". Auxiliary WS-Security "profiles" can include:

UsernameToken profile

X.509 Certificate Token profile, including certificate chains

SAML Token profile

User defined tokens

The choice(s) of what token type is supported is part of the security policy of a web service and can be set from a server console, such as an administration console for the WebLogic Server™ available from BEA Systems, Inc., of San Jose, Calif.

There are several types of configuration of security tokens one might choose to do:

1. whether to enable or disable a particular token type
2. whether to enable a particular token type for use in authentication of the sender
3. necessary conditions for using the token for authentication (e.g. for x509, what must be signed)
4. what precedence of token types should be used if more than one token type is present that could be used for authentication of the sender. For Example, if two or more tokens of the same type are present, the runtime can choose the first one found in the message for authentication.

Configuration mechanisms in a server console can be used for all of these possibilities.

Custom token types are not uncommon because users frequently define their own authentication schemes. A TokenHandler API 106 can be used to define and integrate custom security token types. This API can support attaching additional user-defined information to the security context that is associated with the message.

In one embodiment, Token handler methods include:

Token handler methods:
  serialize( )
  deserialize( )
  extendcontext( )
  validate( )
  authenticate( )

The WS-Security Custom Token Provider Interfaces (WSS TPI) can include SecurityToken; SecurityTokenReference; SecurityTokenHandler which extends the sub-interfaces: SecurityTokenFactory, SecurityTokenReferenceFactory, SecurityTokenProvider, SecurityTokenReferenceProvider, SecurityTokenProcessor; and CredentialProvider. The WS-Security Custom Token Provider Interfaces can reuse SPI interfaces for the CredentialMapper and IdentityAsserter.

SPI interfaces can be integrated into the WSS TPI. For example, the CredentialMapper SPI can be integrated into the WSS TPI CredentialProvider. A getCredential method for WSS TPI can use a getcredential method from the CredentialMapper SPI on the server side where a subject is available. The WSS TPI implementor can use policy information to determine if a credential from CredentialMapper can/should be used (e.g. in case the SecurityToken assertion has only token type info, use the current subject to get credential from the CredentialMapper; else get the credential from the CredentialMapper in anyway and use it if it matches issuerName and claims).

The IdentityAsserter SPI can be integrated into the WSS TPI SecurityTokenProcessor. The SecurityTokenProcessor method Subject getSubject(SecurityToken token) can be replaced with Object getCredential(SecurityToken token, ContextHandler ctxHandler). The ContextHandler can be used to pass information that might be needed to validate the token or derive the credential from it (the SOAP message, XMLSignature and EncrpytedType objects created from it); the call is made after the whole header has been processed; call depends on config info. The WSS runtime can use the obtained credential to call PrincipalAuthenticator.assertIdentity (String tokenType, Object token, ContextHandler contextHandler). This will call the IdentityAsserter configured for the tokenType; implementors of WSS TPI can either map their WSS tokenType to aleady existing security tokenTypes or implement and register a custom IdentityAsserter for their tokenType.

The custom IdentityAsserter can return a CallbackHandler that can handle NameCallback, filling in the user name from the token that has been passed in to IdentityAsserter Embodiments of the present invention may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nan systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A web services security system comprising:
a computer, including a plurality of web services operating thereon which are configured to receive requests and provide responses in the form of messages, and wherein each web service has a security policy associated therewith;
a security framework including a plurality of security service provider interface (SSPI) which is configured to provide identity assertion, credential mapping, and validation of requests to the web services;
a web services security handler associated with each web service, which is configured to extract tokens from the messages directed as requests to that web service;
a token handler application programming interface (API) provided as an interface between the web services security handler and the security framework, which API can be instantiated to accept token types defined by the security policy for the web service, and convert the tokens extracted by the web services security handler to object credentials for processing by the security framework;
wherein when a message is received for a web service, the web services security handler associated with the web service
extracts tokens from the message according to the security policy, and
provides corresponding object credentials via the API to the security framework;
wherein the security framework then uses the object credentials to enable secured access to the web service; and
wherein the messages are simple object access protocol (SOAP) messages, and wherein the token handler API converts token XML in the SOAP messages into java object credentials.

2. The web services security system of claim 1, wherein the security services provider interface is a credential mapper SSPI.

3. The web services security system of claim 1, wherein the security services provider interface is a identity assertion SSPI.

4. The web services security system of claim 1, wherein the token handler API includes a number of sub-interfaces.

5. The web services security system of claim 1, wherein the messages are simple object access protocol (SOAP) messages, and wherein headers of the SOAP messages include the tokens.

6. The web services security system of claim 1, wherein the messages are simple object access protocol (SOAP) messages, and wherein headers of the SOAP messages include a reference to the tokens.

7. The web services security system of claim 1, wherein the SSPI connects to a security framework.

8. A method for providing web services security comprising:
providing a computer, and access to a plurality of web services operating thereon which are configured to receive requests and provide responses in the form of messages, and wherein each web service has a security policy associated therewith;
providing a security framework including a plurality of security service provider interface (SSPI) which is configured to provide identity assertion, credential mapping, and validation of requests to the web services;
providing a web services security handler associated with each web service, which is configured to extract tokens from the messages directed as requests to that web service; and
using a token handler application programming interface (API) provided as an interface between the web services security handler and the security framework, which API can be instantiated to accept token types defined by the security policy for the web service, to convert the tokens extracted by the web services security handler to object credentials for processing by the security framework, including
receiving a message for a web service,
extracting the tokens from the message according to the security policy,
providing corresponding object credentials via the API to the security framework, and
using the security framework with the object credentials to determine whether access to the web service as provided in the message is allowed;
wherein the messages are simple object access protocol (SOAP) messages, and wherein the token handler API converts token XML in the SOAP messages into java object credentials.

9. The method of claim 8, wherein the token handler API includes a number of sub-interfaces.

10. The method of claim 8, wherein the messages are simple object access protocol (SOAP) messages, and wherein headers of the SOAP messages include the tokens.

11. The method of claim 8, wherein the messages are simple object access protocol (SOAP) messages, and wherein headers of the SOAP messages include a reference to the tokens.

12. The method of claim 9, wherein the SSPI connects to a security framework.

13. A computer readable storage medium having instructions persistently stored thereon that when executed by a system including a processor cause the system to perform the steps comprising:
providing access to a plurality of web services which are configured to receive requests and provide responses in the form of messages, and wherein each web service has a security policy associated therewith;
providing a security framework including a plurality of security service provider interface (SSPI) which is configured to provide identity assertion, credential mapping, and validation of requests to the web services;
providing a web services security handler associated with each web service, which is configured to extract tokens from the messages directed as requests to that web service; and
using a token handler application programming interface (API) provided as an interface between the web services security handler and the security framework, which API can be instantiated to accept token types defined by the security policy for the web service, to convert the tokens extracted by the web services security handler to object credentials for processing by the security framework, including
receiving a message for a web service,
extracting the tokens from the message according to the security policy,
providing corresponding object credentials via the API to the security framework, and
using the security framework with the object credentials to determine whether access to the web service as provided in the message is allowed;
wherein the messages are simple object access protocol (SOAP) messages, and wherein the token handler API converts token XML in the SOAP messages into java object credentials.

14. The computer readable storage medium of claim 13, wherein the token handler API includes a number of sub-interfaces.

15. The computer readable storage readable medium of claim 13, wherein the messages are simple object access protocol (SOAP) messages, and wherein headers of the SOAP messages include the tokens.

16. The computer readable storage readable medium of claim 13, wherein the messages are simple object access protocol (SOAP) messages, and wherein headers of the SOAP messages include a reference to the tokens.

17. The computer readable storage readable medium of claim 13, wherein the SSPI connects to a security framework.

* * * * *

UNITED STATES PATENT AND TRADEMARK OFFICE
CERTIFICATE OF CORRECTION

| | | |
|---|---|---|
| PATENT NO. | : 7,788,716 B2 | |
| APPLICATION NO. | : 11/131554 | |
| DATED | : August 31, 2010 | |
| INVENTOR(S) | : Peter Dapkus et al. | |

It is certified that error appears in the above-identified patent and that said Letters Patent is hereby corrected as shown below:

In column 2, line 41, delete "referencess" and insert -- references --, therefor.

In column 3, line 39, delete "getcredential" and insert -- getCredential --, therefor.

In column 4, line 15, delete "aleady" and insert -- already --, therefor.

In column 4, line 20, after "Asserter" insert -- . --.

In column 6, line 30, in claim 12, delete "claim 9," and insert -- claim 8, --, therefor.

In column 7, line 4, in claim 15, after "storage" delete "readable".

In column 8, line 1, in claim 16, after "storage" delete "readable".

In column 8, line 5, in claim 17, after "storage" delete "readable".

Signed and Sealed this
Twenty-sixth Day of July, 2011

David J. Kappos
*Director of the United States Patent and Trademark Office*